United States Patent [19]

Achard et al.

[11] Patent Number: 4,816,173

[45] Date of Patent: Mar. 28, 1989

[54] HEAT SINK MATERIAL

[75] Inventors: Patrick Achard; Didier Mayer, both of Valbonne, France

[73] Assignee: Association pour la Recherche et le developpment des Methodes et Processus Industriels "Armines", Paris, France

[21] Appl. No.: 137,250

[22] Filed: Dec. 23, 1987

Related U.S. Application Data

[63] Continuation-in-part of Ser. No. 811,428, Dec. 20, 1985, abandoned.

[51] Int. Cl.$^4$ ............................................... C09K 5/00
[52] U.S. Cl. ...................................................... 252/70
[58] Field of Search ............ 252/70; 428/305.5, 312.4, 428/312.6, 403, 913

[56] References Cited

U.S. PATENT DOCUMENTS

| | | | |
|---|---|---|---|
| 4,100,091 | 7/1978 | Powell | 252/70 |
| 4,326,238 | 4/1982 | Takeda et al. | 252/70 |
| 4,504,402 | 3/1985 | Chen et al. | 428/403 |

FOREIGN PATENT DOCUMENTS 2480488  10/1981  France .

OTHER PUBLICATIONS

Chem. Abst., vol. 99, No. 12, Sep. 19, 1983, p. 170, Abstract No. 91061(d) Benson, D., Solid State Phase Change Material.

*Primary Examiner*—William J. Van Balen
*Attorney, Agent, or Firm*—Schweitzer & Cornman

[57] ABSTRACT

The invention relates to a thermal energy storage material, comprising a substantially homogeneous mixture of at least one compound having, in a temperature range of between 0° C. and 200°0 C., a solid-solid phase transition having a variation in enthalpy at least equal to 50 J/g, with an organic binder selected from the group consisting of polyepoxyde resins and polyurethane resins, stable at the temperature of the phase transition.

7 Claims, 3 Drawing Sheets

HEAT SINK MATERIAL

This is a continuation-in-part application of Ser. No. 811,428, filed on Dec. 20, 1985, now abandoned.

The present invention relates to a thermal energy storage material, particularly for protecting components, such as electric and electronic components, against thermal shocks.

During the use of certain electric or electronic components, high power must sometimes be dissipated in a very short time. This is particularly the case with electronic components which are actuated intermittently or with electric motors confined in closed spaces.

More generally, its often usefull to absorb the heat which is supplied to any kind of device during peak periods, and to release it later on.

It has already been suggested to use, as a thermal energy storage, medium, materials which have a liquid-solid phase change at the desired temperature, for example saline hydrates. The change of phase is accompanied by a variation in enthalpy by which the material absorbs or give off heat.

These materials with a liquid-solid phase transition however present problems of non congruence, of supercooling, and of changing volume with fusion, which have not yet been solved in a satisfactory manner.

The present invention aims to eliminate these drawbacks by providing a thermal energy storage material which is easier to use than materials with a liquid-solid phase transition.

For this purpose, the invention has as its object a thermal energy storage material comprising a substantially homogeneous mixture of at least one compound having, in a temperature range of between 0° C. and 200° C., a solid-solid phase transition having a change in enthalpy at least equal to 50 J/g, with an organic binder selected from the group consisting of polyepoxide resins and polyurethan resins, stable at the temperature of the phase transition.

Such compounds, having a solid-solid phase transition with the above characteristics, are known. The change in enthalpy at the transition is due to the passage from an anisotropic state to an isotropic state.

The use of a compound with a solid-solid phase transition has many advantages with respect to that of a compound with a liquid-solid transition.

Thus the material according to the invention does not present any problems of non congruence. In addition, the changes in volume at the solid-solid transition are less than those encountered during fusion. The use of these materials is also facilitated by the nonexistence of a liquid phase and corrosion is negligible.

Finally, it is possible, by using mixtures of solid-solid transition compounds, to obtain a continuous range of transition temperatures, which is not the case for materials with a liquid-solid transition.

The use of a polyepoxyde or polyurethan resin allows the material according to the invention to be readily adhered to the device to be protected such as a wall of a building or an electronic component, before the hardening of the resin.

After the hardening, the resin further provides the mechanical strength of the material, and isolates the solid-solid transition compound from the ambient atmosphere.

The mixture can be obtained by adding the constituents in the liquid state.

The material can then be molded or applied in any other desired manner on the component to be protected, thereby embedding or coating this component with the material according to the invention.

The phase transition compound can also be reduced to a powder and mixed with the resin before this latter is hardened.

Figure 1:
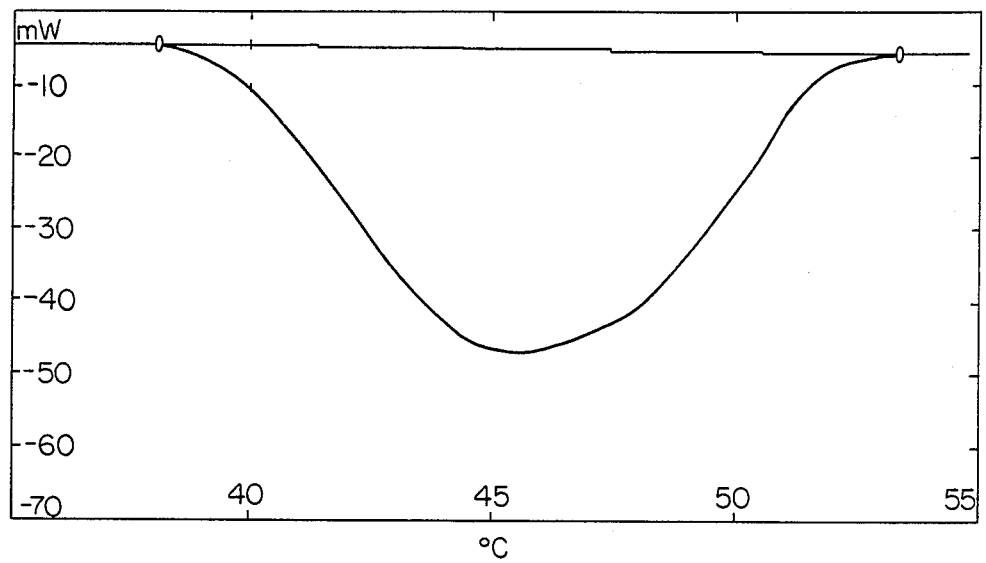
FIGS. 1-4 are thermograms of certain compounds.
Figure 2:
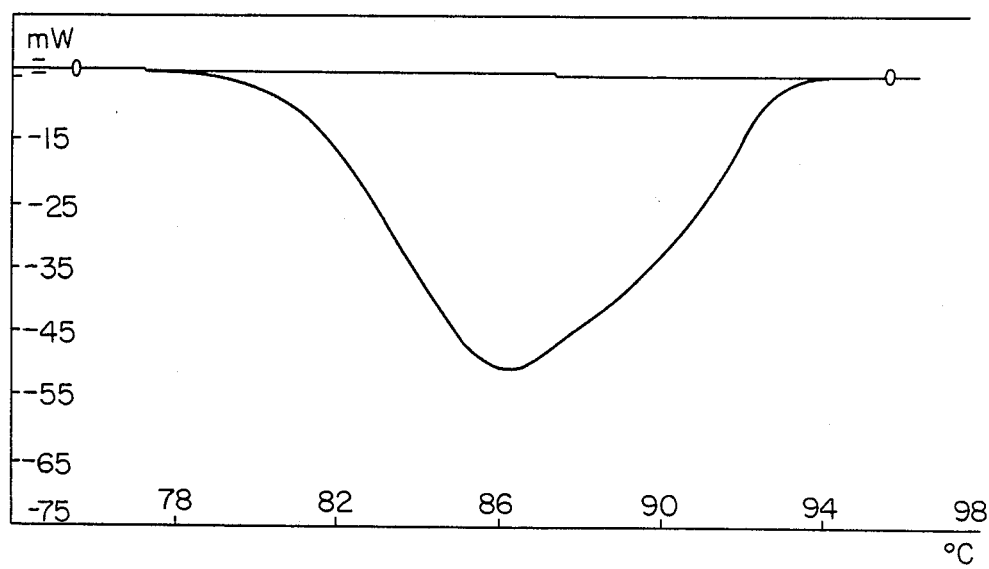
Figure 3:
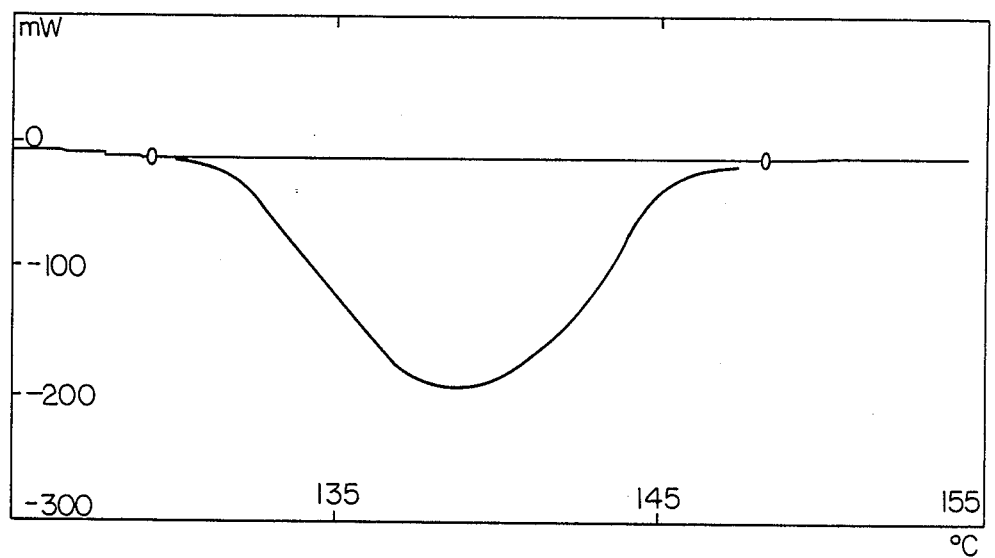

In one particular embodiment of the invention, the compound with the solid-solid phase transition is selected from the group consisting of the polyalcohols or polyhydric alcohols, their amino and nitrated derivatives, and the mixtures of these substances.

These polyalcohols are preferably polyhydric alcohols with a tetrahedral structure, composed of five carbon atoms and having from 2 to 4 hydroxyl radicals attached to the four peripheral carbons.

The polyhydric alcohols have the advantage of requiring a relatively high temperature to pass to the isotropic state, because of the great cohesion of their structure due to the presence of the hydrogen bonds.

In addition, the binary mixtures of the substances of the family of the polyhydric alcohols form stable solid solutions whose transition temperature can be chosen by the composition of the mixture.

More particularly, the polyhydric alcohol used can be selected from the group consisting of pentaerythritol, pentaglycerin and neopentylglycol.

If an amino or nitrated derivative of a polyhydric alcohol is used, it can be selected from the group consisting of
2-amino-2-hydroxymethyl-1,3-propanediol,
2-amino-2-methyl-1,3-propanediol,
2-hydroxymethyl-2-nitro-1,3-propanediol,
and 2-methyl-2-nitro-1,3-propanediol.

Compounds other than the polyhydric alcohols can be used insofar as they have a solid-solid phase transition within the desired temperature range and if their variation in enthalpy is sufficient.

Thus, in particular, the compound with a solid-solid phase transition, can be a propionic acid such as 2,2-dimethyl propionic acid and 2,2-bis(hydroxymethyl) propionic acid.

Polyepoxide resins are thermosetting materials obtained by adding a hardening agent, either co-reactive or catalytic, to a monomeric epoxyde compound. The result is a tridimentionnal polymer hard and rigid.

Whether cold hardening is possible or not hardening is necessary depends on the hardening agent for a given monomeric compound.

Polyurethan resins are generally obtained by the reaction of an isocyanate as hardening agent with a polyhydric alcohol, with or without a catalyst as accelerator.

Polyepoxide resins are, for example, sold by the Swiss Company CIBA, under the trademark Araldite, or by the French Company PROTEX under the trademark Protavic such as Protavic L101, combined with either cold hardener Protavic D12 (linear amine) or hot hardener Protavic D11 (cycloamine).

PROTEX also sells polyurethan resins, such as the complex PU 557 (polyhydric alcohol) + PU 555 (polyisocyanate) + PU 556 (tertiary amine, accelerator).

The energy dissipated or received within the material is then ultimately dissipated to the outside environment or released to any device.

There are given below, by way of non-limiting examples, the characteristics of the solid-solid phase transition of some compounds which can be used for the manufacture of the material according to the invention.

Table 1 gives the transition temperature and the variation in enthalpy for pentaerythritol (C—(CH$_2$—OH)$_4$), pentaglycerin (CH$_3$—C—(CH$_2$—OH)$_3$), and neopentylglycol ((CH$_3$)$_2$—C—(CH$_2$—OH)$_2$), for two of the amino and nitrated compounds of pentaglycerine and neopentylglycol, and for two propionic acids.

TABLE 1

| | $T_{tr}$ °C. | $\Delta H_{tr}$ (J/g) |
|---|---|---|
| pentaerythritol (PE) | 184 | 250 |
| pentaglycerin (PG) | 86 | 161 |
| neopentylglycol (NPG) | 44 | 125 |
| 2-amino-2-hydroxymethyl-1,3-propanediol | 138 | 284 |
| 2-amino-2-methyl-1,3-propanediol | 89 | 240 |
| 2-hydroxymethyl-2-nitro-1,3-propanediol | 81 | 148 |
| 2-methyl-2-nitro-1,3-propanediol | '80 | 190 |
| 2,2-bis (hydroxymethyl) propionic acid | 153 | 287 |
| 2,2-dimethyl propionic acid | 8 | 86 |

Figure 4:
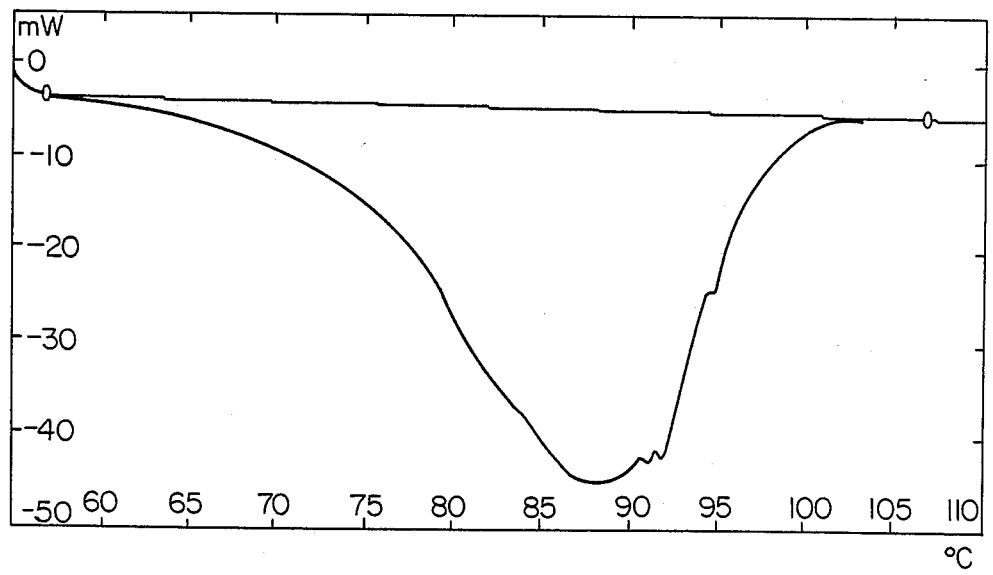

FIGS. 1 and 4 are thermograms obtained on an enthalpy analyzer of neopentylglycol, pentaglycerin, 2-amino-2-hydroxymethyl-1,3-propanediol, and 2-amino-2-methyl-1,3-propanediol.

Table 2 summarizes the characteristics of the endothermic peak for each of these four compounds.

TABLE 2

| | PEAK START TEMPERATURE (°C.) | PEAK END TEMPERATURE (°C.) | TRANSITION ENTHALPY (J/g) | PEAK SUMMIT TEMPERATURE (°C.) |
|---|---|---|---|---|
| NPG | 38.2 | 53.4 | −135.2 | 45.6 |
| PG | 75.6 | 95.8 | −157.6 | 86.2 |
| 2-amino-2-hydroxy-methyl-1,3-propanediol | 129.4 | 148.3 | −251.6 | 138.8 |
| 2-amino-2-methyl-1,3-propanediol | 56.9 | 106.9 | −218.0 | 88.0 |

Table 3 gives the value of the temperature and transition enthalpy for some values of the pentaglycerin mass function.

TABLE 3

| MASS FRACTION (%) in PG | T tr (°C.) | $\Delta H$ tr (J/g) |
|---|---|---|
| 13 | 37.2 | 88 |
| 17.7 | 29.3 | 75 |
| 28 | 29.2 | 74.5 |
| 36.5 | 35.9 | 71 |
| 47.5 | 36.2 | 84 |

Table 4 shows the values of the transition temperature and enthalpy for pentaglycerin on the one hand, and on the other hand for a material according to the invention made by mixture of pentaglycerin with an "Araldite" as the organic binder.

TABLE 4

| | T tr (°C.) | $\Delta H$ tr (J/g) |
|---|---|---|
| 2 Hydroxymethyl-2-Methyl-1,3 Propanediol (PG) | 83–84 | 148.4 |
| Rapid setting Araldite | | |
| 50% in PG | 84 | 69.8 |
| 67% in PG | 84 | 96.1 |
| Araldite MY 740 Hardener HY 905 50% in PG | 85 | 68.6 |
| Araldite MCY 212 Hardener HY 956 50% PG | 85 | 65.6 |

Figure 5:
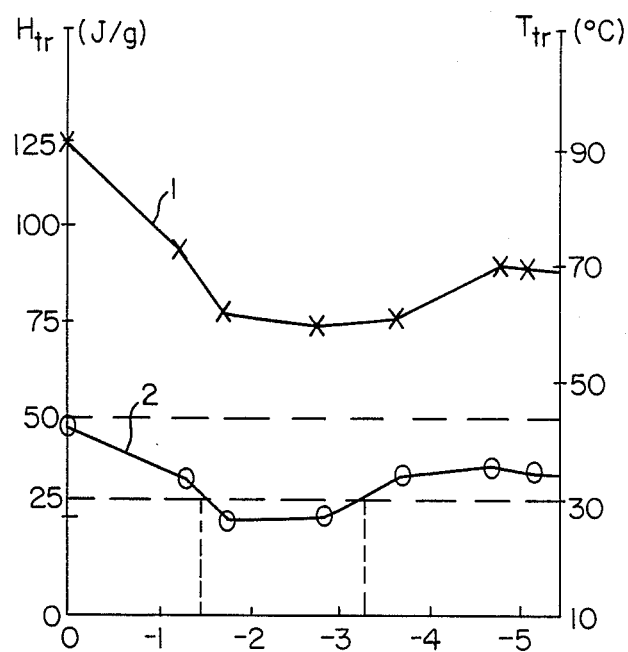
FIG. 5 shows the transition enthalpy of a mixture of certain compounds.

FIG. 5 shows at 1 the transition enthalpy, and at 2, the transition temperature, of a mixture of pentaglycerin and neopentylglycol for proportions of pentaglycerin of between 0 and 50%.

This mixture is obtained by combining the constituents in the liquid state. In view of the high vapor pressure of these constituents as they are near their fusion temperature, the composition is controlled by chromatography in the gaseous phase.

FIG. 5 clearly shows that, if the transition temperature is limited to 30° C., for example, the mass proportion of pentaglycerin must be between 14% and 33%.

Table 5 shows the values of the transition temperature and enthalpy for different mass fractions of the solid-solid transition compound in some materials according to the invention, namely:

(1) PE and Protavic L101 (epoxyde)+Protex D11 (cold hardener)

(2) PG and Protavic L101+Protex D12

(3) NPG and Protavic L101+Protex D12

(4) PE and Protavic L101+Protex D11 (hot hardener)

(5) PG and Protavic L101+Protex D11

(6) PE and Protex PU557+PU556+PU555

(7) PG and Protex PU557+PU556+PU555

(8) NPG and Protex PU557+PU556+PU555

TABLE 5

| | MASS FRACTION | | | | | | | |
|---|---|---|---|---|---|---|---|---|
| | 50% | | 60% | | 70% | | 80% | |
| MATERIAL | $\Delta H_{tr}$(J/g) | $T_{tr}$(°C.) | $\Delta H_{tr}$(J/g) | $T_{tr}$(°C.) | $\Delta H_{tr}$(J/g) | $T_{tr}$(°C.) | $\Delta H_{tr}$(J/g) | $T_{tr}$(°C.) |
| (1) | 125 | 185 | 150 | 184,8 | 172 | 185 | — | — |
| (2) | 72,6 | 80,6 | 89 | 80 | 103,8 | 80,3 | 113,5 | 80,2 |
| (3) | — | — | 56,5 | 38,3 | 60 | 36,5 | 90,6 | 39 |
| (4) | — | — | 161 | 185,2 | 188,5 | 185 | 213 | 184,5 |
| (5) | — | — | 68,8 | 80,2 | 101 | 79,6 | 113 | 80,3 |

TABLE 5-continued

| MATERIAL | MASS FRACTION | | | | | | | |
|---|---|---|---|---|---|---|---|---|
| | 50% | | 60% | | 70% | | 80% | |
| | $\Delta H_{tr}(J/g)$ | $T_{tr}(°C.)$ | $\Delta H_{tr}(J/g)$ | $T_{tr}(°C.)$ | $\Delta H_{tr}(J/g)$ | $T_{tr}(°C.)$ | $\Delta H_{tr}(J/g)$ | $T_{tr}(°C.)$ |
| (6) | — | — | 126,2 | 185,4 | 156,8 | 185,9 | 208,2 | 171,8 |
| (7) | — | — | 85,6 | 80,6 | 99,8 | 80,3 | 114,1 | 80,5 |
| (8) | — | — | 69,2 | 39,5 | 79,5 | 39,1 | — | — |

It can be seen that the transition temperature is very close to that of the pure phase transition compound, and that the change in enthalpy corresponds to that of the mass fonction of this compound.

It has been verified that these values remain constant as soon as the organic binder has been completely polymerized, which shows the compatibility of the two components of the material according to the invention.

As concerns the mass fraction of the phase transition compound, it can be as high as 80% without encountering any problem of homogeneity or of mechanical strength.

We claim:

1. Thermal energy storage material, comprising a substantially homogeneous mixture of at least one compound having, in a temperature range of between 0° C. and 200° C., a solid-solid phase transition having a variation in enthalpy at least equal to 50 J/g, with an organic binder selected from the group consisting of polyepoxide resins and polyurethan resins, stable at the temperature of the phase transition.

2. Material according to claim 1 wherein said compound with solid-solid phase transition is selected from the group consisting of the polyhydric alcohols, their amino and nitrated derivatives, and mixtures of these compounds.

3. Material according to claim 2, wherein said polyhydric alcohols are polyhydric alcohols with a tetrahedral structure, comprising five atoms of carbon and having from 2 to 4 hydroxyl radicals attached to the four peripheral carbons.

4. Material according to claim 3, wherein said polyhydric alcohols is selected from the group consisting of pentaerythritol, pentaglycerin, and neopentylglycol.

5. Material according to claim 2, wherein said amino or nitrated derivatives is selected from the group consisting of 2-amino-2-hydroxymethyl-1,3-propanediol, 2-amino-2-methyl-1,3-propanediol, and 2-methyl-2-nitro-1,3-propanediol.

6. Material according to claim 1, wherein said compound with solid-solid phase transition is a propionic acid.

7. Material according to claim 6, wherein said propionic acid is selected from the group consisting of 2,2-dimethyl propionic acid and 2,2-bis(hydroxymethyl)-propionic acid.

* * * * *